United States Patent
Ye et al.

(10) Patent No.: US 9,541,798 B2
(45) Date of Patent: Jan. 10, 2017

(54) METHOD OF MANUFACTURING LIQUID CRYSTAL DISPLAY PANEL

(71) Applicant: SHENZHEN CHINA STAR OPTOELECTRONICS TECHNOLOGY CO., LTD., Guangdong (CN)

(72) Inventors: Yanxi Ye, Guangdong (CN); YuChih Wu, Guangdong (CN); Chung Yi Chiu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 79 days.

(21) Appl. No.: 14/654,848

(22) PCT Filed: Apr. 20, 2015

(86) PCT No.: PCT/CN2015/077007
§ 371 (c)(1),
(2) Date: Jun. 23, 2015

(87) PCT Pub. No.: WO2016/119317
PCT Pub. Date: Aug. 4, 2016

(65) Prior Publication Data
US 2016/0313610 A1    Oct. 27, 2016

(30) Foreign Application Priority Data
Jan. 29, 2015 (CN) .......................... 2015 1 0045183

(51) Int. Cl.
G02F 1/1337 (2006.01)
G02F 1/1335 (2006.01)
(Continued)

(52) U.S. Cl.
CPC ....... *G02F 1/133788* (2013.01); *G02F 1/1337* (2013.01); *G02F 1/1368* (2013.01);
(Continued)

(58) Field of Classification Search
CPC ................... G02F 1/133788; G02F 1/133753; G02F 1/133707; G02F 1/1337
See application file for complete search history.

(56) References Cited

U.S. PATENT DOCUMENTS

6,939,587 B1 * 9/2005 Kumar .............. G02F 1/133788
349/124
9,229,278 B2 * 1/2016 Zhao ..................... G02F 1/1337
(Continued)

*Primary Examiner* — Jaehwan Oh
(74) *Attorney, Agent, or Firm* — Osha Liang LLP (57) ABSTRACT

A method of manufacturing a liquid crystal display panel is provided, which comprises steps of: manufacturing an array substrate; manufacturing a color film substrate; coating a pixel alignment film on the pixel electrode layer; performing a first optical alignment process on the pixel alignment film; coating a common alignment film on the common electrode layer; performing a second optical alignment process on the common alignment film; and performing an encasing alignment process on the array substrate and the color film substrate. This solves the technological problem of white dropouts on the screen from certain viewing angles.

19 Claims, 6 Drawing Sheets

(51) Int. Cl.
*G02F 1/1343* (2006.01)
*G02F 1/1362* (2006.01)
*G02F 1/1368* (2006.01)

(52) U.S. Cl.
CPC .... *G02F 1/13439* (2013.01); *G02F 1/133512* (2013.01); *G02F 1/133516* (2013.01); *G02F 1/133711* (2013.01); *G02F 1/136286* (2013.01); *G02F 2001/136295* (2013.01); *G02F 2201/121* (2013.01); *G02F 2201/123* (2013.01)

(56) References Cited

U.S. PATENT DOCUMENTS

| | | | | |
|---|---|---|---|---|
| 2002/0047971 A1* | 4/2002 | Kwon | ............... | G02F 1/133753 349/129 |
| 2004/0125295 A1* | 7/2004 | Kim | ................ | G02F 1/133632 349/129 |
| 2005/0280754 A1* | 12/2005 | Kume | ............... | G02F 1/133707 349/106 |
| 2006/0114398 A1* | 6/2006 | Koma | ............... | G02F 1/133707 349/139 |
| 2012/0307187 A1* | 12/2012 | Tanaka | ................ | G02F 1/1362 349/123 |
| 2013/0196565 A1* | 8/2013 | Miyake | ................ | G02F 1/1337 445/25 |
| 2013/0342796 A1* | 12/2013 | Chiu | ................ | G02F 1/133788 349/123 |
| 2015/0185514 A1* | 7/2015 | Zhao | ................ | G02F 1/133788 349/43 |
| 2015/0185561 A1* | 7/2015 | Zhao | ................ | G02F 1/133753 349/106 |

\* cited by examiner

METHOD OF MANUFACTURING LIQUID CRYSTAL DISPLAY PANEL

FIELD OF THE INVENTION

The present invention relates to the field of liquid crystal displays, and more particularly related to a method of manufacturing a liquid crystal display panel.

BACKGROUND OF THE INVENTION

With the development of society, large-size liquid crystal display devices have been applied to various home sites and, public places. Different applications require different liquid crystal display devices. For example, at home, a user normally walks around the liquid crystal display device so that a wide viewing angle of the liquid crystal display device is more desirable. In public, in order to facilitate more users viewing the screen, the liquid crystal display device is generally placed in a higher place so that a downwards viewing angle of the liquid crystal display device is more desirable.

In order to fulfill the requirements of the user's viewing angle, the production of the liquid crystal display devices requires a larger investment in production cost for improving the display effects of the liquid crystal display devices and preventing the liquid crystal display devices from having problems with white dropouts on the screen from certain viewing angles.

Therefore, there is a need for providing a method of manufacturing a liquid crystal display panel to solve the existing problems of the prior art.

SUMMARY OF THE INVENTION

An objective of the present invention is to provide a method of manufacturing a liquid crystal display panel which reduces production costs and has a higher quality image display to solve the problem of the production of the conventional liquid crystal display device with higher production costs and to solve the problem of white dropouts on the screen from certain viewing angles.

In order to solve the aforementioned drawbacks of the prior art, the present invention provides a technical solution comprising the following steps:

The embodiment of the present invention provides a method of manufacturing a liquid crystal display panel where a pixel unit includes a plurality of display domains, comprising steps of:

manufacturing an array substrate where an inner surface includes a pixel electrode layer;

manufacturing a color film substrate where an inner surface includes a common electrode layer;

coating a pixel alignment film on the pixel electrode layer, the pixel alignment film includes a first unordered polymer;

performing a first optical alignment process on the pixel alignment film so that the first unordered polymer is converted to a first ordered polymer, wherein an exposure amount of performing the first optical alignment process on the pixel alignment film of different display domains is determined according to a main viewing angle of the liquid crystal display panel;

coating a common alignment film on the common electrode layer, the common alignment film includes a second unordered polymer;

performing a second optical alignment process on the common alignment film so that the second unordered polymer is converted to a second ordered polymer; and performing an encasing alignment process on the array substrate and the color film substrate, for forming a liquid crystal cell.

In the method of manufacturing a liquid crystal display panel described above, the exposure amount of performing the first optical alignment process on the pixel alignment film of the display domains corresponding to the main viewing angle of the liquid crystal display panel is greater than the other exposure amounts of performing the first optical alignment process on the pixel alignment film of the display domains.

In the method of manufacturing a liquid crystal display panel described above, an alignment direction of the first optical alignment process is perpendicular to an alignment direction of the second optical alignment process.

In the method of manufacturing a liquid crystal display panel described above, the step of manufacturing the array substrate further comprises a step of:

making a scanning line, a thin film field effect transistor, a data line, and a pixel electrode on a base substrate to form the array substrate.

In the method of manufacturing a liquid crystal display panel described above, the step of manufacturing the color film substrate further comprises a step of:

making a black matrix, a color film resist, and a common electrode on a base substrate to form the color film substrate.

In the method of manufacturing a liquid crystal display panel described above, the step of performing the first optical alignment process specifically comprises performing an exposure process on the first unordered polymer through using a specific direction polarized light at a specific angle, for forming the first ordered polymer; and the step of performing the second optical alignment process specifically comprises performing an exposure process on the second unordered polymer through using a specific direction polarized light at a specific angle, for forming the second ordered polymer.

The embodiment of the present invention further provides a method of manufacturing a liquid crystal display panel where a pixel unit includes a plurality of display domains, comprising steps of:

manufacturing an array substrate where an inner surface includes a pixel electrode layer;

manufacturing a color film substrate where an inner surface includes a common electrode layer;

coating a pixel alignment film on the pixel electrode layer, wherein the pixel alignment film includes a first unordered polymer;

performing a first optical alignment process on the pixel alignment film so that the first unordered polymer is converted to a first ordered polymer;

coating a common alignment film on the common electrode layer, wherein the common alignment film includes a second unordered polymer;

performing a second optical alignment process on the common alignment film so that the second unordered polymer is converted to a second ordered polymer, wherein an exposure amount of performing the second optical alignment process on the common alignment film of different display domains is determined according to a main viewing angle of the liquid crystal display panel; and performing an encasing alignment process on the array substrate and the color film substrate, for forming a liquid crystal cell.

In the method of manufacturing a liquid crystal display panel described above, the exposure amount of performing the second optical alignment process on the common alignment film of the display domains corresponding to the main viewing angle of the liquid crystal display panel is greater than the other exposure amounts of performing the second optical alignment process on the common alignment film of the display domains.

In the method of manufacturing a liquid crystal display panel described above, an alignment direction of the first optical alignment process is perpendicular to an alignment direction of the second optical alignment process.

In the method of manufacturing a liquid crystal display panel described above, the step of manufacturing the array substrate further comprises a step of:

making a scanning line, a thin film field effect transistor, a data line, and a pixel electrode on a base substrate to form the array substrate.

In the method of manufacturing a liquid crystal display panel described above, the step of manufacturing the color film substrate further comprises a step of:

making a black matrix, a color film resist, and a common electrode on a base substrate to form the color film substrate.

In the method of manufacturing a liquid crystal display panel described above, the step of performing the first optical alignment process specifically comprises performing an exposure process on the first unordered polymer through using a specific direction polarized light at a specific angle, for forming the first ordered polymer; and the step of performing the second optical alignment process specifically comprises performing an exposure process on the second unordered polymer through using a specific direction polarized light at a specific angle, for forming the second ordered polymer.

The embodiment of the present invention further provides a method of manufacturing a liquid crystal display panel where a pixel unit includes a plurality of display domains, comprising steps of:

manufacturing an array substrate where an inner surface includes a pixel electrode layer;

manufacturing a color film substrate where an inner surface includes a common electrode layer;

coating a pixel alignment film on the pixel electrode layer, wherein the pixel alignment film includes a first unordered polymer;

performing a first optical alignment process on the pixel alignment film so that the first unordered polymer is converted to a first ordered polymer, wherein an exposure amount of performing the first optical alignment process on the pixel alignment film of different display domains is determined according to a main viewing angle of the liquid crystal display panel;

coating a common alignment film on the common electrode layer, wherein the common alignment film includes a second unordered polymer;

performing a second optical alignment process on the common alignment film so that the second unordered polymer is converted to a second ordered polymer, wherein an exposure amount of performing the second optical alignment process on the common alignment film of different display domains is determined according to a main viewing angle of the liquid crystal display panel; and performing an encasing alignment process on the array substrate and the color film substrate, for forming a liquid crystal cell.

In the method of manufacturing a liquid crystal display panel described above, the exposure amount of performing the first optical alignment process on the pixel alignment film of the display domains corresponding to the main viewing angle of the liquid crystal display panel is greater than the other exposure amounts of performing the first optical alignment process on the pixel alignment film of the display domains.

In the method of manufacturing a liquid crystal display panel described above, the exposure amount of performing the second optical alignment process on the common alignment film of the display domains corresponding to the main viewing angle of the liquid crystal display panel is greater than the other exposure amounts of performing the second optical alignment process on the common alignment film of the display domains.

In the method of manufacturing a liquid crystal display panel described above, an alignment direction of the first optical alignment process is perpendicular to an alignment direction of the second optical alignment process.

In the method of manufacturing a liquid crystal display panel described above, the step of manufacturing the array substrate further comprises a step of:

making a scanning line, a thin film field effect transistor, a data line, and a pixel electrode on a base substrate to form the array substrate.

In the method of manufacturing a liquid crystal display panel described above, the step of manufacturing the color film substrate further comprises a step of:

making a black matrix, a color film resist, and a common electrode on a base substrate to form the color film substrate.

In the method of manufacturing a liquid crystal display panel described above, the step of performing the first optical alignment process specifically comprises performing an exposure process on the first unordered polymer through using a specific direction of polarized light at a specific angle, for forming the first ordered polymer; and the step of performing the second optical alignment process specifically comprises performing an exposure process on the second unordered polymer through using a specific direction polarized light at a specific angle, for forming the second ordered polymer.

In comparison with the conventional technology of manufacturing a liquid crystal display panel, the method of manufacturing a liquid crystal display panel of the present invention can numerical reference the exposure amount of performing the first optical alignment process on the pixel alignment film of different display domains, according to the main viewing angle of the liquid crystal display panel and thereby based on reducing the production cost of the liquid crystal display panel for ensuring the display effect of the liquid crystal display panel. The present invention solves the problem of the higher production costs of manufacturing the conventional liquid crystal display device and the problem of white dropouts on the screen from certain viewing angles.

To make the above embodiments of the invention more comprehensible, the preferred embodiments being adopted by the present invention to achieve the above and other objectives can be best understood by referring to the following detailed description of the preferred embodiments and the accompanying drawings as detailed below.

DETAILED DESCRIPTION OF THE PREFERRED EMBODIMENTS

This description of the exemplary embodiments is intended to be read in connection with the accompanying drawings, which are to be considered part of the entire written description. In the description, relative numerical references such as "lower," "upper," "horizontal," "vertical, ", "above," "below," "up," "down," "top", and "bottom" as well as derivatives thereof should be construed to refer to the orientation as then described or as shown in the drawing under discussion. These relative numerical references are for convenience of description and do not require that the apparatus be constructed or operated in a particular orientation, and do not limit the scope of the invention.

Referring to the drawings of the present invention, the same symbol represents the same component.

Figure 1:
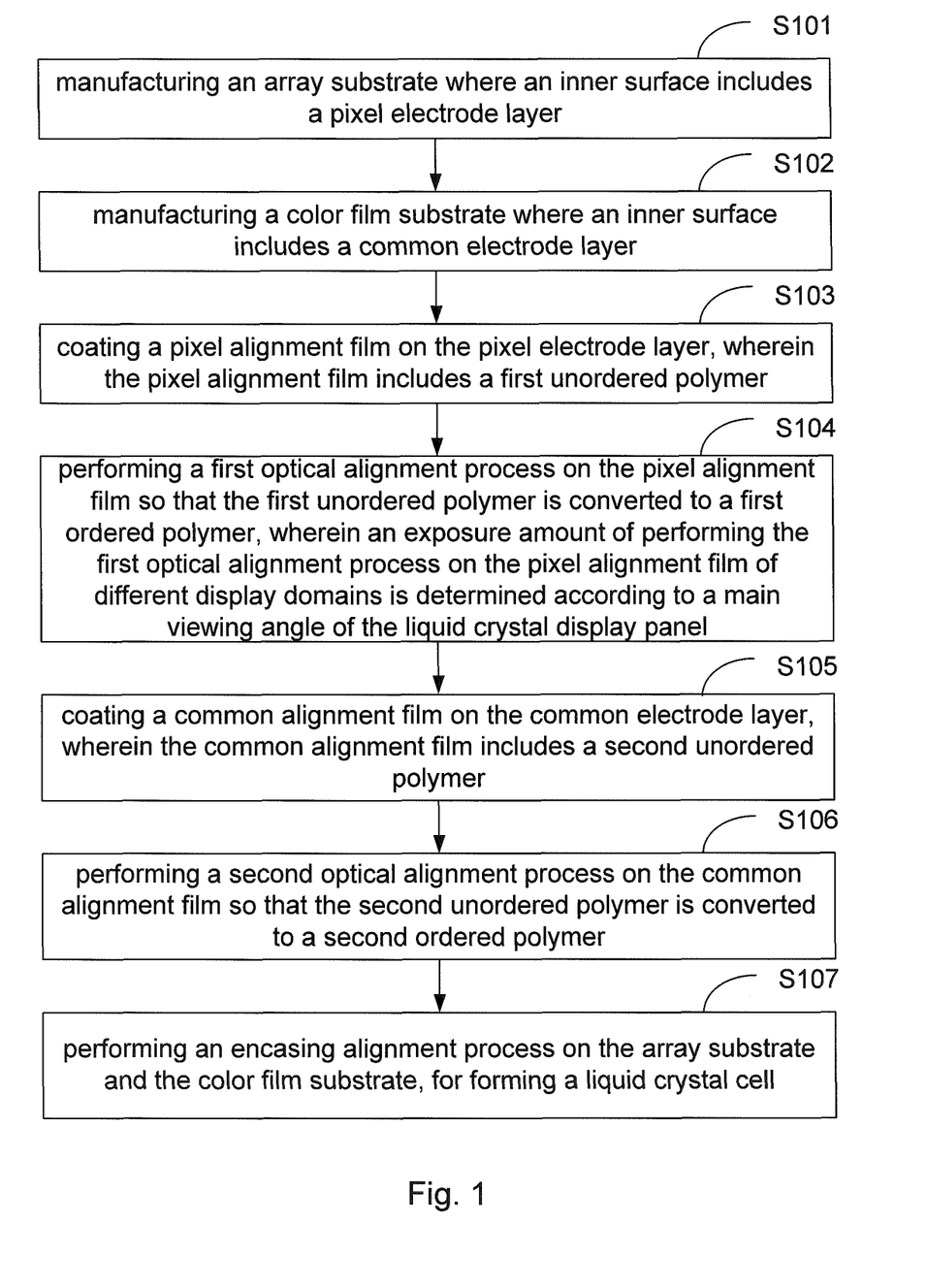
FIG. 1 is a flowchart of a method of manufacturing a liquid crystal display panel according to a first preferred embodiment of the present invention.

Please refer to FIG. 1, which is a flowchart of a method of manufacturing a liquid crystal display panel according to a first preferred embodiment of the present invention. The method of manufacturing a liquid crystal display panel according to a first preferred embodiment of the present invention is adapted for the production of the liquid crystal display panel. A pixel unit of the liquid crystal display panel includes a plurality of display domains. The method of manufacturing a liquid crystal display panel according to the preferred embodiment comprises the following steps of:

step S101, an array substrate is manufactured, and an inner surface of the array substrate includes a pixel electrode layer;

step S102, a color film substrate is manufactured, and an inner surface of the color film substrate includes a common electrode layer;

step S103, a pixel alignment film is coated on the pixel electrode layer, the pixel alignment film includes a first unordered polymer;

step S104, a first optical alignment process is performed on the pixel alignment film so that the first unordered polymer is converted to a first ordered polymer, and an exposure amount of performing the first optical alignment process on the pixel alignment film of different display domains is determined according to a main viewing angle of the liquid crystal display panel is determined;

step S105, a common alignment film is coated on the common electrode layer, the common alignment film includes a second unordered polymer;

step S106, a second optical alignment process is performed on the common alignment film so that the second unordered polymer is converted to a second ordered polymer; and step S107, an encasing alignment processing is performed on the array substrate and the color film substrate, for forming a liquid crystal cell.

The method of manufacturing a liquid crystal display panel according to the preferred embodiment ends in the step S107.

The detailed procedures of each step of the preferred embodiments of the present invention will be described in the following detailed description.

In the step S101, a scanning line, a thin film field effect transistor, a data line, and a pixel electrode are made on a base substrate to form the array substrate. The pixel electrode layer including a pixel electrode is disposed in the inner surface of the array substrate, then the step S102 is executed.

In the step S102, a black matrix, a color film resist, and a common electrode are made on a base substrate to form the color film substrate. The common electrode layer including a common electrode is disposed in the inner surface of the color film substrate, then the step S103 is executed.

In the step S103, a pixel alignment film is coated on the pixel electrode layer of the array substrate. The pixel alignment film includes a first unordered polymer. Polymers in the first unordered polymer are in a disordered arrangement state, then the step S104 is executed.

In the step S104, a first optical alignment process is performed on the pixel alignment film so that the first unordered polymer is converted to an ordered arrangement state. Namely, the first unordered polymer is converted to a first ordered polymer. In the process of the first optical alignment process, an exposure processing is performed on the first unordered polymer through using a specific direction polarized light at a specific angle, for forming the first ordered polymer. A liquid crystal molecule has a certain pre-inclination angle under the action of the first ordered polymer, thereby realizing an alignment effect. The greater the exposure amount of performing the first optical alignment process, the less an alignment angle where the pixel alignment film corresponds.

Thus, in this step, the exposure amount of performing the first optical alignment process on the pixel alignment film of different display domains is determined according to a main viewing angle of the liquid crystal display panel determined by a user, so that a display effect of the main viewing angle will be better. Preferably, the exposure amount of performing the first optical alignment process on the pixel alignment film of the display domains corresponding to the main viewing angle of the liquid crystal display panel is greater than the other exposure amounts of performing the first optical alignment process on the pixel alignment film of the display domains, then the step S105 is executed.

In the step S105, a common alignment film is coated on the common electrode layer of the color film substrate. The common alignment film includes a second unordered polymer. Polymers in the second unordered polymer are in a disordered arrangement state, then the step S106 is executed.

In the step S106, a second optical alignment process is performed on the common alignment film so that the second unordered polymer is converted to an ordered arrangement state. Namely, the second unordered polymer is converted to a second ordered polymer. Preferably, an alignment direction of the first optical alignment process is perpendicular to an alignment direction of the second optical alignment process, then the step S107 is executed.

In the step S107, an encasing alignment processing is performed on the array substrate after performing the first optical alignment process and the color film substrate after performing the second optical alignment process for forming a liquid crystal cell.

This completes the manufacturing processes of the method of manufacturing a liquid crystal display panel according to the preferred embodiment.

A following specific example will describe the manufacturing processes of the method of manufacturing a liquid crystal display panel of the preferred embodiment.

Figure 2:
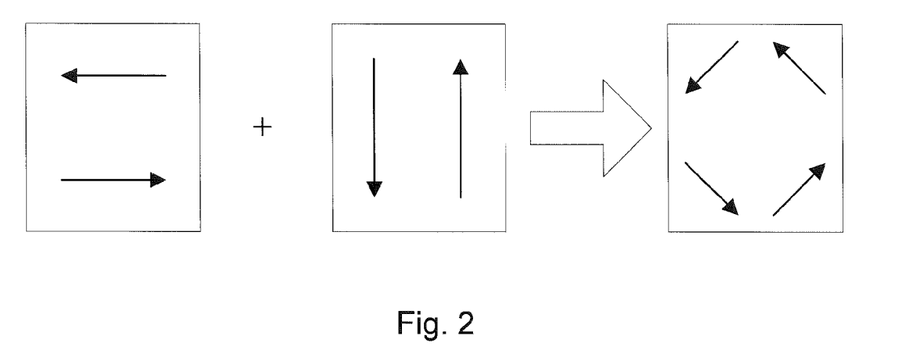
FIG. 2 is a schematic view of a display domain of a pixel unit of a method of manufacturing a liquid crystal display panel according to a first preferred embodiment of the present invention.

Please refer to FIG. 2, which is a schematic view of a display domain of a pixel unit of a method of manufacturing a liquid crystal display panel according to a first preferred embodiment of the present invention. The left side of FIG. 2 shows a first light alignment direction of the pixel alignment film of the array substrate of the display domain. The first light alignment direction of the pixel alignment film in the upper side of FIG. 2 is left-tilt, and the first light alignment direction of the pixel alignment film in the lower side of FIG. 2 inclines to the right side. The middle of FIG. 2 shows a second light alignment direction of the common alignment film of a side of the color film substrate of the display domain. The second light alignment direction of the common alignment film in the left side of FIG. 2 is down-tilt, and the second light alignment direction of the common alignment film in the right side of FIG. 2 is updip. Therefore, the pixel unit performing the encasing alignment processing includes four display domains in upper left, lower left, upper right, and lower right of the pixel unit. Setting a plurality of display domains can increase the viewing angle of the liquid crystal display panel. In order to improve the display effect of the down viewing angle of the liquid crystal display panel, the exposure amount of performing the first optical alignment process of the lower side of the pixel alignment film of the array substrate is increased.

Figure 3:
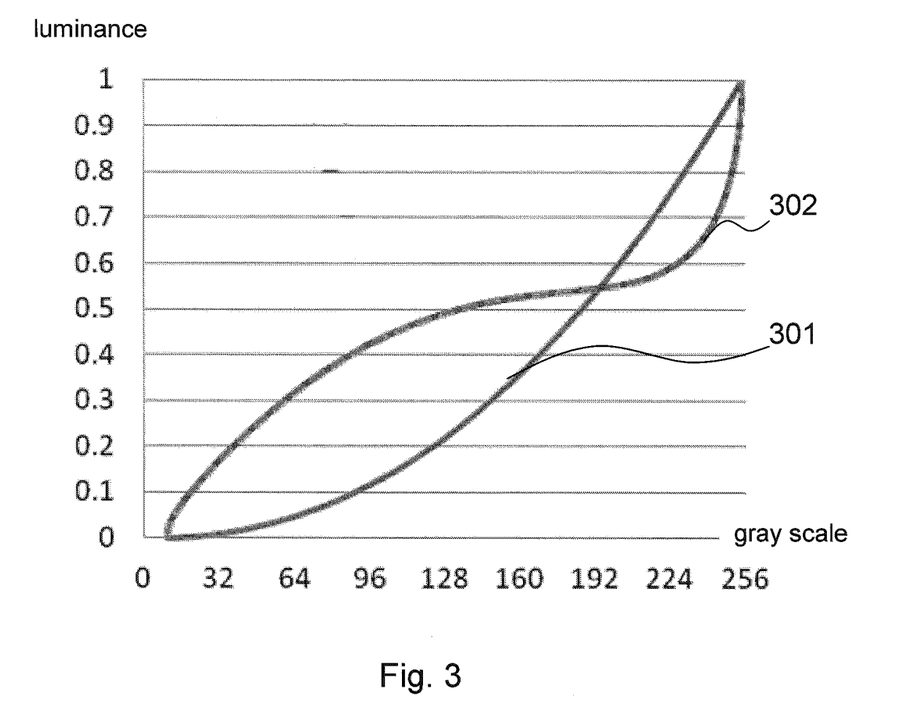
FIG. 3 is a gamma-curve schematic diagram of different viewing angles of conventional liquid crystal display panel.

Please refer to FIG. 3, which is a gamma-curve schematic diagram of different viewing angles of conventional liquid crystal display panels. The numerical reference 301 denotes a gamma curve in a horizontal vision situation which fully complies with the vision requirements of a human eye viewing a screen. The numerical reference 302 denotes a gamma curve in a vision situation with an up viewing angle of 60 degrees, a down viewing angle of 60 degrees, a left viewing angle of 60 degrees, and a right viewing angle of 60 degrees. Although the pixel unit has been divided into a plurality of display domains, the gamma curve 302 and the standard gamma curve 301 have certain differences therebetween.

Figure 4:
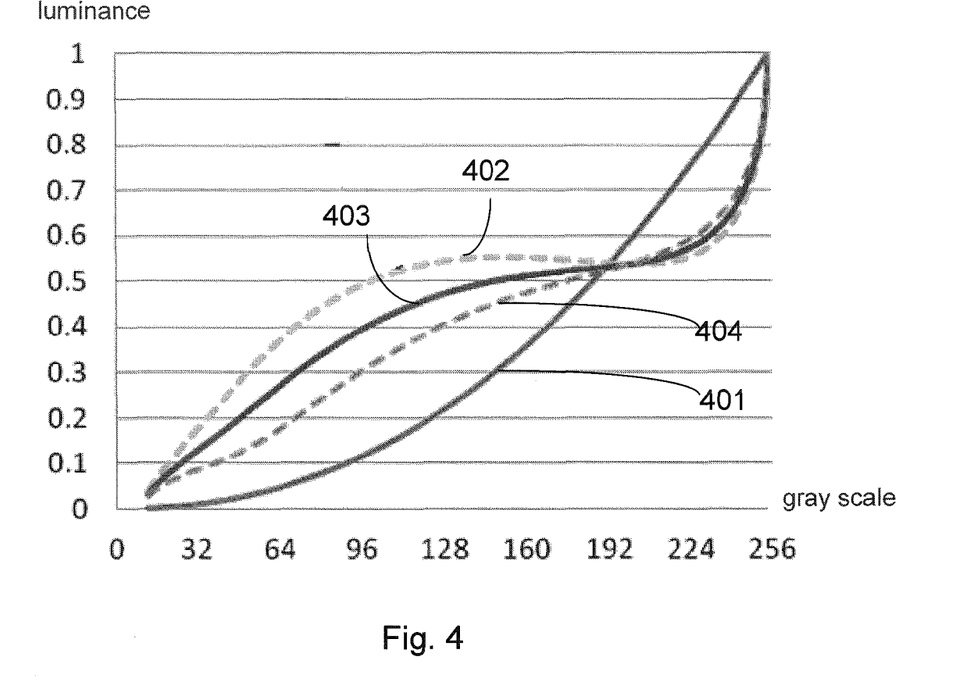
FIGS. 4 is a gamma-curve schematic diagram of different viewing angles of the liquid crystal display panel manufactured by the method of manufacturing a liquid crystal display panel according to a first preferred embodiment of the present invention.

Please refer to FIG. 4, which is a gamma-curve schematic diagram of different viewing angles of a liquid crystal display panel manufactured by the method of manufacturing a liquid crystal display panel according to a first preferred embodiment of the present invention. The numerical reference 401 denotes a gamma curve in a horizontal vision situation which fully complies with the vision requirements of a human eye viewing a screen. The numerical reference 402 denotes a gamma curve in a vision situation with an up viewing angle of 60 degrees. The numerical reference 403 denotes a gamma curve in a vision situation with a left viewing angle of 60 degrees and a right viewing angle of 60 degrees. The numerical reference 404 denotes a gamma curve in a vision situation with a down viewing angle of 60 degrees. The gamma curve 403 is the same as the conventional gamma curve 302. The gamma curve 402 is further away from the gamma curve 401 compared with the gamma curve 402. The gamma curve 404 is closer to the gamma curve 401 compared with the gamma curve 402. Therefore, by increasing the exposure amount of performing the first optical alignment process the lower side of the pixel alignment film of the array substrate in the preferred embodiment, the display effect of the down viewing angle (main viewing angle) can be improved on the basis of sacrificing the display effect of the up viewing angle. This can ensure the display effect of the liquid crystal display panel based on without increasing the manufacturing cost of the liquid crystal display panel.

Of course, a location of increasing the exposure amount of performing the first optical alignment process can be adjusted according to the different main viewing angles. If the user needs to improve the display effect of the up viewing angle, the user can set the up viewing angle as the main viewing angle so that the exposure amount of performing the first optical alignment process of the upper side of the pixel alignment film of the array substrate can be increased.

The method of manufacturing the liquid crystal display panel of the preferred embodiment discloses that the exposure amount of performing the first optical alignment process on the pixel alignment film of different display domains is determined according to a main viewing angle of the liquid crystal display panel so that the display effect of the liquid crystal display panel can be ensured based on decreasing the manufacturing cost of the liquid crystal display panel.

Figure 5:
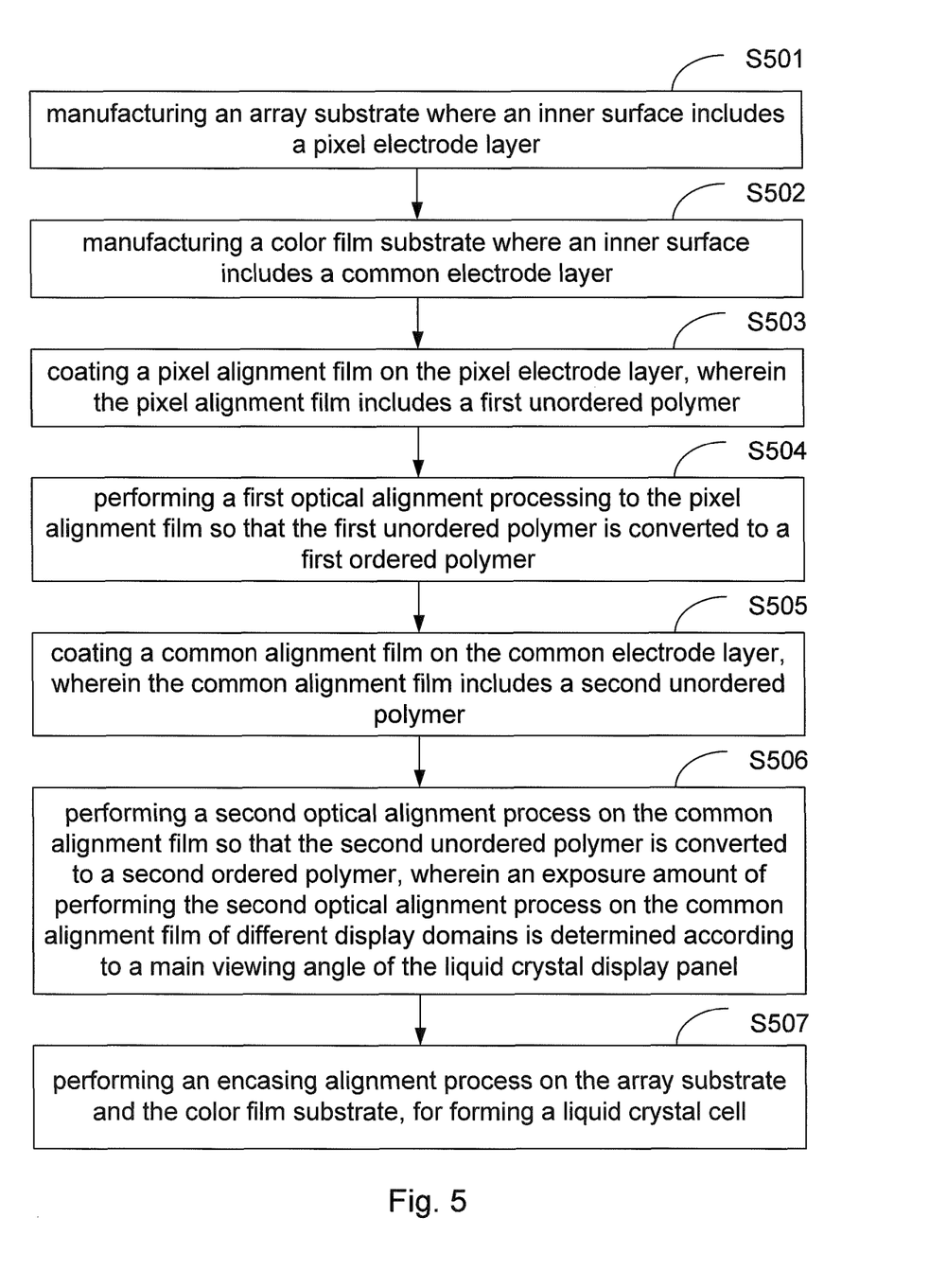
FIG. 5 is a flowchart of a method of manufacturing a liquid crystal display panel according to a second preferred embodiment of the present invention.

Please refer to FIG. 5, which is a flowchart of a method of manufacturing a liquid crystal display panel according to a second preferred embodiment of the present invention. The method of manufacturing a liquid crystal display panel according to the second preferred embodiment of the present invention is adapted for manufacturing the liquid crystal display panel. A pixel unit of the liquid crystal display panel includes a plurality of display domains. The method of manufacturing a liquid crystal display panel according to the preferred embodiment comprises the following steps:

step S501, an array substrate is manufactured, and an inner surface of the array substrate includes a pixel electrode layer;

step S502, a color film substrate is manufactured, and an inner surface of the color film substrate includes a common electrode layer;

step S503, a pixel alignment film is coated on the pixel electrode layer, the pixel alignment film includes a first unordered polymer;

step S504, a first optical alignment process is performed on the pixel alignment film so that the first unordered polymer is converted to a first ordered polymer;

in a step S505, a common alignment film is coated on the common electrode layer, the common alignment film includes a second unordered polymer;

in a step S506, a second optical alignment process is performed on the common alignment film so that the second unordered polymer is converted to a second ordered polymer, and an exposure amount of performing the second optical alignment process on the common alignment film of different display domains is determined according to a main viewing angle of the liquid crystal display panel is determined; preferably, an alignment direction of the first optical alignment process is perpendicular to an alignment direction of the second optical alignment process; and step S507, an encasing alignment processing is performed on the array substrate and the color film substrate, for forming a liquid crystal cell.

The method of manufacturing a liquid crystal display panel according to the preferred embodiment ends in the step S507.

The difference between this preferred embodiment and the first preferred embodiment mentioned above is that: in the step S504, when the first optical alignment process is performed on the pixel alignment film of different display domains, the same exposure amount is adapted, and in the step S506, the exposure amount of performing the second optical alignment process on the common alignment film of different display domains is determined according to a main viewing angle of the liquid crystal display panel determined by a user, so that a display effect of the main viewing angle will be optimized. Preferably, the exposure amount of performing the second optical alignment process on the common alignment film of the display domains corresponding to the main viewing angle of the liquid crystal display panel is greater than the other exposure amounts of performing the second optical alignment process on the common alignment film of the display domains.

The method of manufacturing the liquid crystal display panel of the preferred embodiment discloses that the exposure amount of performing the second optical alignment process on the common alignment film of different display domains is determined according to the main viewing angle of the liquid crystal display panel so that the display effect of the liquid crystal display panel can be ensured based on decreasing the manufacturing cost of the liquid crystal display panel.

Figure 6:
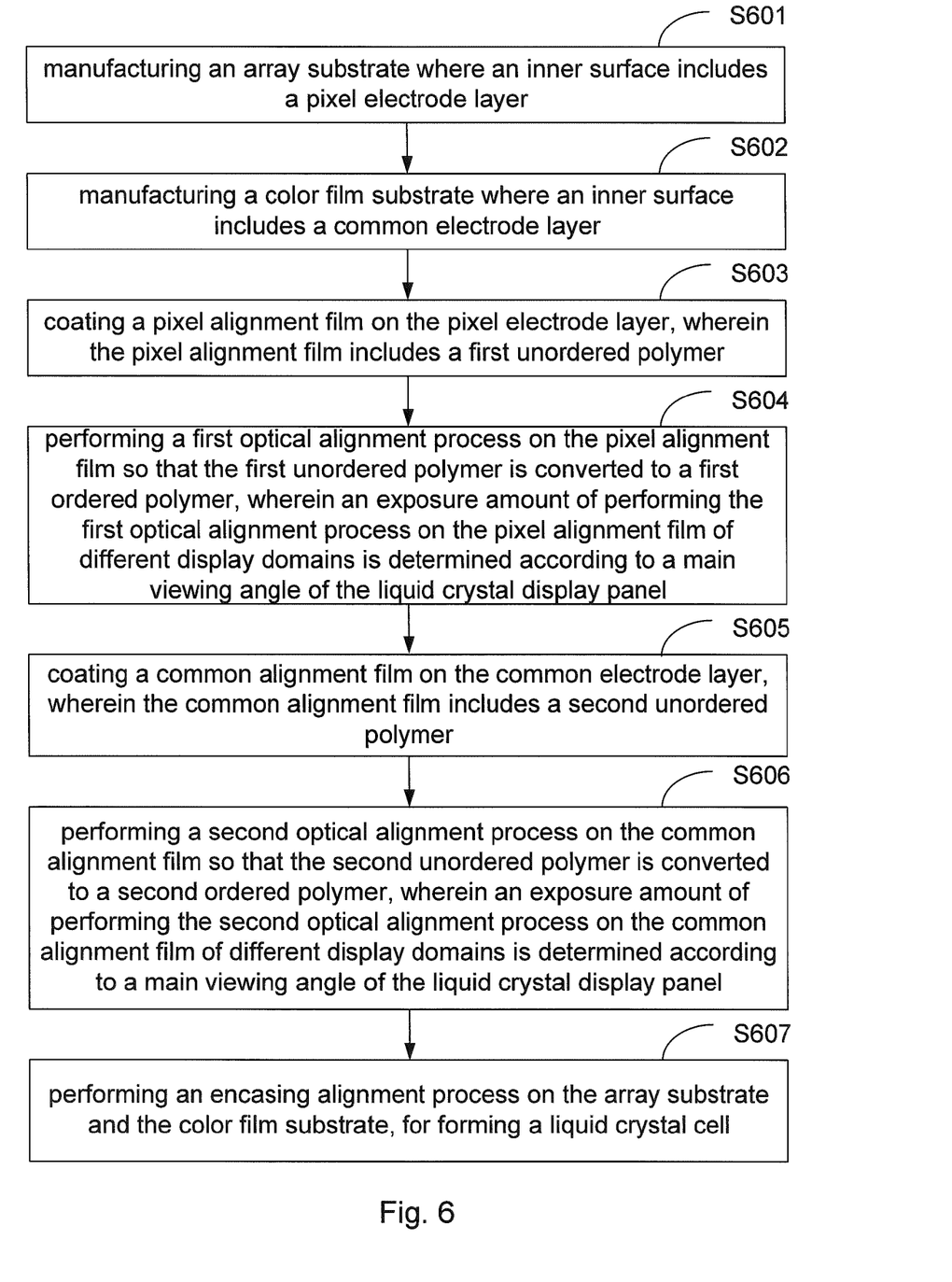
FIG. 6 is a flowchart of a method of manufacturing a liquid crystal display panel according to a third preferred embodiment of the present invention.

Please refer to FIG. 6, which is a flowchart of a method of manufacturing a liquid crystal display panel according to a third preferred embodiment of the present invention. The method of manufacturing a liquid crystal display panel according to the third preferred embodiment of the present invention is adapted for manufacturing the liquid crystal display panel. A pixel unit of the liquid crystal display panel includes a plurality of display domains. The method of manufacturing a liquid crystal display panel according to the preferred embodiment comprises the following steps of:

step S601, an array substrate is manufactured, and an inner surface of the array substrate includes a pixel electrode layer;

step S602, a color film substrate is manufactured, and an inner surface of the color film substrate includes a common electrode layer;

step S603, a pixel alignment film is coated on the pixel electrode layer, the pixel alignment film includes a first unordered polymer;

step S604, a first optical alignment process is performed on the pixel alignment film so that the first unordered polymer is converted to a first ordered polymer, and an exposure amount of performing the first optical alignment process on the pixel alignment film of different display domains is determined according to a main viewing angle of the liquid crystal display panel is determined;

step S605, a common alignment film is coated on the common electrode layer, the common alignment film includes a second unordered polymer;

step S606, a second optical alignment process is performed on the common alignment film so that the second unordered polymer is converted to a second ordered polymer, and an exposure amount of performing the second optical alignment process on the common alignment film of different display domains is determined according to a main viewing angle of the liquid crystal display panel is determined; preferably, an alignment direction of the first optical alignment process is perpendicular to an alignment direction of the second optical alignment process; and step S607, an encasing alignment processing is performed on the array substrate and the color film substrate, for forming a liquid crystal cell.

The method of manufacturing a liquid crystal display panel according to the preferred embodiment ends in the step S607.

The difference between the preferred embodiment and the first preferred embodiment mentioned above is that: in the step S606, the exposure amount of performing the second optical alignment process on the common alignment film of different display domains is determined simultaneously according to a main viewing angle of the liquid crystal display panel determined by a user, so that a display effect of the main viewing angle will be better. Preferably, the exposure amount of performing the second optical alignment process on the common alignment film of the display domains corresponding to the main viewing angle of the liquid crystal display panel is greater than the other exposure amounts of performing the second optical alignment process on the common alignment film of the display domains.

The method of manufacturing the liquid crystal display panel of the preferred embodiment discloses that the exposure amount of performing the first optical alignment process on the pixel alignment film of different display domains and the exposure amount of performing the second optical alignment process on the common alignment film of different display domains are determined simultaneously according to the main viewing angle of the liquid crystal display panel. The display effect of the main viewing angle can be adjusted through the both sides of the alignment films so as to make the adjustment of the display effect more stable and further ensure the display effect of the liquid crystal display panel.

The present invention is the method of manufacturing the liquid crystal display panel which discloses that the exposure amount of performing the first optical alignment process on the pixel alignment film of different display domains is determined according to the main viewing angle of the liquid crystal display panel so that the display effect of the liquid crystal display panel can be ensured based on decreasing the manufacturing cost of the liquid crystal display panel. Thus, the present invention solves the problem of the production of the conventional liquid crystal display device with higher production costs and solves the problem of white dropouts on the screen from certain viewing angles.

It can be understood that although each of the above embodiments focuses on different technical details, the main technical features are the same for each of the above embodiments. Certain parts not described in each embodiment in detail can be found in the detailed description of the specification, and are not repeated redundantly.

As described above, the present invention has been described with preferred embodiments thereof, and it is understood that many changes and modifications to the described embodiment can be carried out without departing from the scope and the spirit of the invention that is intended to be limited only by the appended claims.

What is claimed is:

1. A method of manufacturing a liquid crystal display panel where a pixel unit includes a plurality of display domains, comprising steps of:

manufacturing an array substrate where an inner surface includes a pixel electrode layer;

manufacturing a color film substrate where an inner surface includes a common electrode layer;

coating a pixel alignment film on the pixel electrode layer, wherein the pixel alignment film includes a first unordered polymer;

performing a first optical alignment process on the pixel alignment film so that the first unordered polymer is converted to a first ordered polymer, wherein an exposure amount of performing the first optical alignment process on the pixel alignment film of different display domains is determined according to a main viewing angle of the liquid crystal display panel;

coating a common alignment film on the common electrode layer, wherein the common alignment film includes a second unordered polymer;

performing a second optical alignment process on the common alignment film so that the second unordered polymer is converted to a second ordered polymer; and performing an encasing alignment process on the array substrate and the color film substrate, for forming a liquid crystal cell.

2. The method of manufacturing a liquid crystal display panel according to claim 1, wherein the exposure amount of performing the first optical alignment process on the pixel alignment film of the display domains corresponding to the main viewing angle of the liquid crystal display panel is greater than the other exposure amounts of performing the first optical alignment process on the pixel alignment film of the display domains.

3. The method of manufacturing a liquid crystal display panel according to claim 1, wherein an alignment direction of the first optical alignment process is perpendicular to an alignment direction of the second optical alignment process.

4. The method of manufacturing a liquid crystal display panel according to claim 1, wherein the step of manufacturing the array substrate further comprises a step of:
making a scanning line, a thin film field effect transistor, a data line, and a pixel electrode on a base substrate to form the array substrate.

5. The method of manufacturing a liquid crystal display panel according to claim 1, wherein the step of manufacturing the color film substrate further comprises a step of:
making a black matrix, a color film resist, and a common electrode on a base substrate to form the color film substrate.

6. The method of manufacturing a liquid crystal display panel according to claim 1, wherein the step of performing the first optical alignment process specifically comprises performing an exposure process on the first unordered polymer through using a specific direction polarized light at a specific angle, for forming the first ordered polymer; and
the step of performing the second optical alignment process specifically comprising performing an exposure process on the second unordered polymer through using a specific direction polarized light at a specific angle, for forming the second ordered polymer.

7. A method of manufacturing a liquid crystal display panel where a pixel unit includes a plurality of display domains, comprising steps of:
manufacturing an array substrate where an inner surface includes a pixel electrode layer;
manufacturing a color film substrate where an inner surface includes a common electrode layer;
coating a pixel alignment film on the pixel electrode layer, wherein the pixel alignment film includes a first unordered polymer;
performing a first optical alignment process on the pixel alignment film so that the first unordered polymer is converted to a first ordered polymer;
coating a common alignment film on the common electrode layer, wherein the common alignment film includes a second unordered polymer;
performing a second optical alignment process on the common alignment film so that the second unordered polymer is converted to a second ordered polymer, wherein an exposure amount of performing the second optical alignment process on the common alignment film of different display domains is determined according to a main viewing angle of the liquid crystal display panel; and
performing an encasing alignment process on the array substrate and the color film substrate, for forming a liquid crystal cell.

8. The method of manufacturing a liquid crystal display panel according to claim 7, wherein the exposure amount of performing the second optical alignment process on the common alignment film of the display domains corresponding to the main viewing angle of the liquid crystal display panel is greater than the other exposure amounts of performing the second optical alignment process on the common alignment film of the display domains.

9. The method of manufacturing a liquid crystal display panel according to claim 7, wherein an alignment direction of the first optical alignment process is perpendicular to an alignment direction of the second optical alignment process.

10. The method of manufacturing a liquid crystal display panel according to claim 7, wherein the step of manufacturing the array substrate further comprises a step of:
making a scanning line, a thin film field effect transistor, a data line, and a pixel electrode on a base substrate to form the array substrate.

11. The method of manufacturing a liquid crystal display panel according to claim 7, wherein the step of manufacturing the color film substrate further comprises a step of:
making a black matrix, a color film resist, and a common electrode on a base substrate to form the color film substrate.

12. The method of manufacturing a liquid crystal display panel according to claim 7, wherein the step of performing the first optical alignment process specifically comprises performing an exposure process on the first unordered polymer through using a specific direction polarized light at a specific angle, for forming the first ordered polymer; and
the step of performing the second optical alignment process specifically comprises performing an exposure process on the second unordered polymer through using a specific direction polarized light at a specific angle for forming the second ordered polymer.

13. A method of manufacturing a liquid crystal display panel where a pixel unit includes a plurality of display domains, comprising steps of:
manufacturing an array substrate where an inner surface includes a pixel electrode layer;
manufacturing a color film substrate where an inner surface includes a common electrode layer;
coating a pixel alignment film on the pixel electrode layer, wherein the pixel alignment film includes a first unordered polymer;
performing a first optical alignment process on the pixel alignment film so that the first unordered polymer is converted to a first ordered polymer, wherein an exposure amount of performing the first optical alignment process on the pixel alignment film of different display domains is determined according to a main viewing angle of the liquid crystal display panel;

coating a common alignment film on the common electrode layer, wherein the common alignment film includes a second unordered polymer;

performing a second optical alignment process on the common alignment film so that the second unordered polymer is converted to a second ordered polymer, wherein an exposure amount of performing the second optical alignment process on the common alignment film of different display domains is determined according to a main viewing angle of the liquid crystal display panel; and performing an encasing alignment process on the array substrate and the color film substrate, for forming a liquid crystal cell.

14. The method of manufacturing a liquid crystal display panel according to claim 13, wherein the exposure amount of performing the first optical alignment process on the pixel alignment film of the display domains corresponding to the main viewing angle of the liquid crystal display panel is greater than the other exposure amounts of performing the first optical alignment process on the pixel alignment film of the display domains.

15. The method of manufacturing a liquid crystal display panel according to claim 13, wherein the exposure amount of performing the second optical alignment process on the common alignment film of the display domains corresponding to the main viewing angle of the liquid crystal display panel is greater than the other exposure amounts of performing the second optical alignment process on the common alignment film of the display domains.

16. The method of manufacturing a liquid crystal display panel according to claim 13, wherein an alignment direction of the first optical alignment process is perpendicular to an alignment direction of the second optical alignment process.

17. The method of manufacturing a liquid crystal display panel according to claim 13, wherein the step of manufacturing the array substrate further comprises a step of:

making a scanning line, a thin film field effect transistor, a data line, and a pixel electrode on a base substrate to form the array substrate.

18. The method of manufacturing a liquid crystal display panel according to claim 13, wherein the step of manufacturing the color film substrate further comprises a step of:

making a black matrix, a color film resist, and a common electrode on a base substrate to form the color film substrate.

19. The method of manufacturing a liquid crystal display panel according to claim 13, wherein the step of performing the first optical alignment process specifically comprises performing an exposure process on the first unordered polymer through using a specific direction polarized light at a specific angle, for forming the first ordered polymer; and the step of performing the second optical alignment process specifically comprises performing an exposure process on the second unordered polymer through using a specific direction polarized light at a specific angle, for forming the second ordered polymer.

* * * * *